US011513233B2

(12) United States Patent
Wajnberg et al.

(10) Patent No.: US 11,513,233 B2
(45) Date of Patent: Nov. 29, 2022

(54) DRONE ESCORT SYSTEM

(71) Applicants: Adam Wajnberg, Netanya (IL); Aviv Bachar, Tel Mond (IL); Yaakov Stein, Jerusalem (IL)

(72) Inventors: Adam Wajnberg, Netanya (IL); Aviv Bachar, Tel Mond (IL); Yaakov Stein, Jerusalem (IL)

(73) Assignee: Adam Wajnberg et al., Netanya (IL)

( * ) Notice: Subject to any disclaimer, the term of this patent is extended or adjusted under 35 U.S.C. 154(b) by 414 days.

(21) Appl. No.: 16/643,595

(22) PCT Filed: Aug. 29, 2018

(86) PCT No.: PCT/IL2018/050956
§ 371 (c)(1),
(2) Date: Mar. 2, 2020

(87) PCT Pub. No.: WO2019/043704
PCT Pub. Date: Mar. 7, 2019

(65) Prior Publication Data
US 2021/0157012 A1 May 27, 2021

Related U.S. Application Data
(60) Provisional application No. 62/551,251, filed on Aug. 29, 2017.

(51) Int. Cl.
*G01S 19/15* (2010.01)
*B64C 39/02* (2006.01)
(Continued)

(52) U.S. Cl.
CPC ............ *G01S 19/15* (2013.01); *B64C 39/024* (2013.01); *G01S 5/04* (2013.01); *H04N 5/23203* (2013.01);
(Continued)

(58) Field of Classification Search
CPC ...... G01S 19/15; H04N 5/23203; H04W 4/06
(Continued)

(56) References Cited

U.S. PATENT DOCUMENTS 9,725,171 B1 * 8/2017 Carmack ............... B64C 39/024
10,163,177 B2 12/2018 Farris et al.
(Continued)

FOREIGN PATENT DOCUMENTS

CN 103196430 7/2013
KR 20120109563 A * 10/2012

OTHER PUBLICATIONS

Altawy R, Youssef AM. Security, privacy, and safety aspects of civilian drones: A survey. ACM Transactions on Cyber-Physical Systems. Feb. 20, 2017.
(Continued)

*Primary Examiner* — Harry K Liu
(74) *Attorney, Agent, or Firm* — A.C. Entis-IP Ltd.; Allan C. Entis

(57) ABSTRACT

The present disclosure describes systems and methods for escorting small unmanned aircraft (herein drones). An escorting drone approaches the escorted drone and transmits to it an escort signal. In an embodiment, the escort signal is a GNSS signal fashioned to be the same as the GNSS signal that would be received by the escorted drone, other than being slightly stronger in signal strength and having slightly altered component delays. In another embodiment, the escort signal is a radio frequency control channel signal. Escorting may be utilized to guide a drone from a preprogrammed point to a docking zone in a droneport; to guide a drone though an urban canyon or inside a building where GNSS signals are not reliably received; to retrieve a drone
(Continued)

with which communications has been lost; or to escort a drone to safety out of a no-flight zone such as around an airport.

15 Claims, 6 Drawing Sheets

(51) Int. Cl.
*G01S 5/04* (2006.01)
*H04W 4/06* (2009.01)
*H04N 5/232* (2006.01)
*H04N 7/18* (2006.01)

(52) U.S. Cl.
CPC .............. *H04N 7/185* (2013.01); *H04W 4/06* (2013.01); *B64C 2201/145* (2013.01); *B64C 2201/18* (2013.01)

(58) Field of Classification Search
USPC .......................................................... 342/60
See application file for complete search history.

(56) References Cited

U.S. PATENT DOCUMENTS

| | | |
|---|---|---|
| 10,395,544 B1 | 8/2019 | Harris et al. |
| 2017/0092109 A1* | 3/2017 | Trundle ............... G05D 1/0011 |
| 2017/0103659 A1 | 4/2017 | Jin |
| 2017/0225801 A1* | 8/2017 | Bennett ................... B64F 1/222 |
| 2017/0230555 A1 | 8/2017 | Tabirian et al. |
| 2017/0287242 A1 | 10/2017 | Meganathan |

OTHER PUBLICATIONS

Kerns AJ, Shepard DP, Bhatti JA, Humphreys TE. Unmanned aircraft capture and control via GPS spoofing. Journal of Field Robotics, Jul. 31, 2014.

International Search Report and Written Opinion dated Dec. 24, 2018, for PCT Application No. PCT/IL2018/050956 filed Aug. 29, 2018.

Office Action dated May 29, 2022, in corresponding Israeli application No. 272979 filed Feb. 29, 2020 including translation.

* cited by examiner

DRONE ESCORT SYSTEM

RELATED APPLICATIONS

The present application is a U.S. National Phase of PCT Application No. PCT/IL2018/050956 filed on Aug. 29, 2018, which claims the benefit under 35 U.S.C. 119(e) of U.S. Provisional Application 62/551,251 filed on Aug. 29, 2017 the disclosures of which are incorporated herein by reference.

FIELD

The present disclosure relates generally to small unmanned aircraft (drones) and more particularly to systems and methods for escorting drones.

BACKGROUND

Unmanned aircraft, also known as unmanned aerial vehicles (UAVs), and more informally as "drones", are powered aircraft that do not carry an onboard human pilot. Drones may be manually controlled by human operators via radio frequency control links, or may be autonomous to some lesser or greater degree. Drones are typically equipped with on-board Global Navigation Satellite System (GNSS) receivers with which they ascertain their location, such receivers most commonly deriving location information from the US Global Positioning System (GPS), but may receive information from other systems, such as the Russian GLONASS, the European Galileo, or the Chinese BeiDou satellite systems. A completely autonomous drone may be preprogrammed with a desired destination location, and thereafter independently determine its flight pattern based on comparing its present location as derived from the GNSS receiver with the desired location.

Drones have become extremely commonplace, and are expected to further proliferate as their use transitions from military, hobby and photography scenarios to mass-market applications such as package delivery, search and rescue, traffic monitoring, and video surveillance. This proliferation raises numerous logistics problems, especially in the crowded urban environments where their deployment is most advantageous. Drones need to navigate around buildings and in future may be constrained to recognized flight lanes. Attempting to translate the current model of commercial manned aircraft to control of drones results in a large number of pilots, each manning a single drone over a dedicated radio link. Not only would this be prohibitively expensive, the required radio links would be intermittent due to buildings blocking reception and interference from other drones on the same or neighboring frequencies. More significantly, manual operation can't provide the rapid control necessary to avoid accidental collisions of drones into buildings or people, and collisions between two or more drones.

Mass deployment of drones, for example, for package delivery, depends on providing autonomous drones and mechanisms of ensuring their proper operation and safety. In particular, drones may need to land in particular desired landing zones that can't be known when the drone is initially programmed, to navigate in areas (such as inside buildings) where GNSS signals are not received, to travel in tightly restricted flight lanes, and/or to avoid specific no-drone-flight areas.

SUMMARY

An embodiment of the disclosure relates to providing methods for a first drone, optionally referred to as an escorting drone, to escort a second drone, also referred to as an escorted drone so that the escorted drone follows a desired flight path. Use cases of such escorting may be, for example, to desired landing zones, through or from areas of limited GNSS reception, or away from no-flight zones. The escorting is achieved by the escorting drone transmitting an escort signal to the escorted drone. The escort signal may be any signal that the escorted drone has been configured to receive. In an embodiment the escort signal may be a GNSS signal, while in another embodiment it may be a radio frequency control channel signal. In some embodiments the escort signal may be continuously adapted as the escorted drone moves. In some embodiments the escorting drone may need to track the motion of the escorted drone.

In an exemplary first use case, an autonomous drone may be preprogrammed to navigate to a droneport (an airport for drone take-off and landing) but the precise docking port in the droneport may not be initially known. When the drone arrives at the entrance to the droneport an escorting drone is launched, approaches the escorted drone, transmits an escort signal to the escorted drone, and escorts it to the desired docking port by transmitting an escort signal to the escorted drone.

In another exemplary user case, an autonomous drone may be required to navigate inside a building where satellite navigation signals can't be received. When the drone approaches the entrance to the building an escorting drone is launched, approaches the escorted drone, transmits an escort signal to the escorted drone, and escorts it through the building by transmitting an escort signal to the escorted drone.

In another example of a use case, an operator of a manually operated drone may have lost control of it, leaving it stranded. A rescue-service escorting drone is sent to escort the lost drone to safety by transmitting an escort signal.

In another use case, a drone strays into a no-flight zone, e.g., near a hospital or airport. Upon its detection, an escorting drone is launched, approaches the escorted drone, and causes it to exit the no-flight zone by transmitting an escort signal.

This summary provides an overview of the relevant concepts and several use cases of the present invention. It is clear that there may be many more applications of this escort mechanism, and the examples provided are not intended to limit the scope of the claimed subject matter.

DETAILED DESCRIPTION

Unmanned aircraft, also known as unmanned aerial vehicles (UAVs), and more informally as drones, are powered aircraft that do not carry an onboard human pilot. Drones may be controlled over radio frequency control links, or may be autonomous to some lesser or greater degree. Drone radio frequency control links typically operate in unlicensed frequency bands, such as the 2.4 GHz or 5.8 GHz Industrial, Scientific, and Medical (ISM) radio bands.

Drones are typically equipped with on-board Global Navigation Satellite System (GNSS) receivers with which they may ascertain their location, such receivers most commonly deriving location information from the US Global Positioning System (GPS), but may receive information from other systems, such as the Russian GLONASS, the European Galileo, the Chinese BeiDou satellite systems, and further GNSS systems that may be deployed in the future.

A controlled drone may be manually controlled or controlled by a computerized system. In either case the radio frequency control link is typically two-way, with the controller sending navigation commands to the drone, and the drone sending GNSS coordinates and optionally video and telemetry data back to the controller.

An autonomous drone may be preprogrammed with a desired destination location, and thereafter independently determine its flight pattern based on comparing its present location as derived from the GNSS receiver with the desired location. Straight-line navigation is possible in open locales, but in developed environments drones will need to navigate around buildings and may be constrained to fly in recognized flight lanes. Furthermore, drones need to avoid colliding into people, birds, or other drones. These challenges are more complex in crowded urban environments, precisely where the mass deployment of autonomous drones for applications such as package delivery is the most advantageous.

Figure 1:
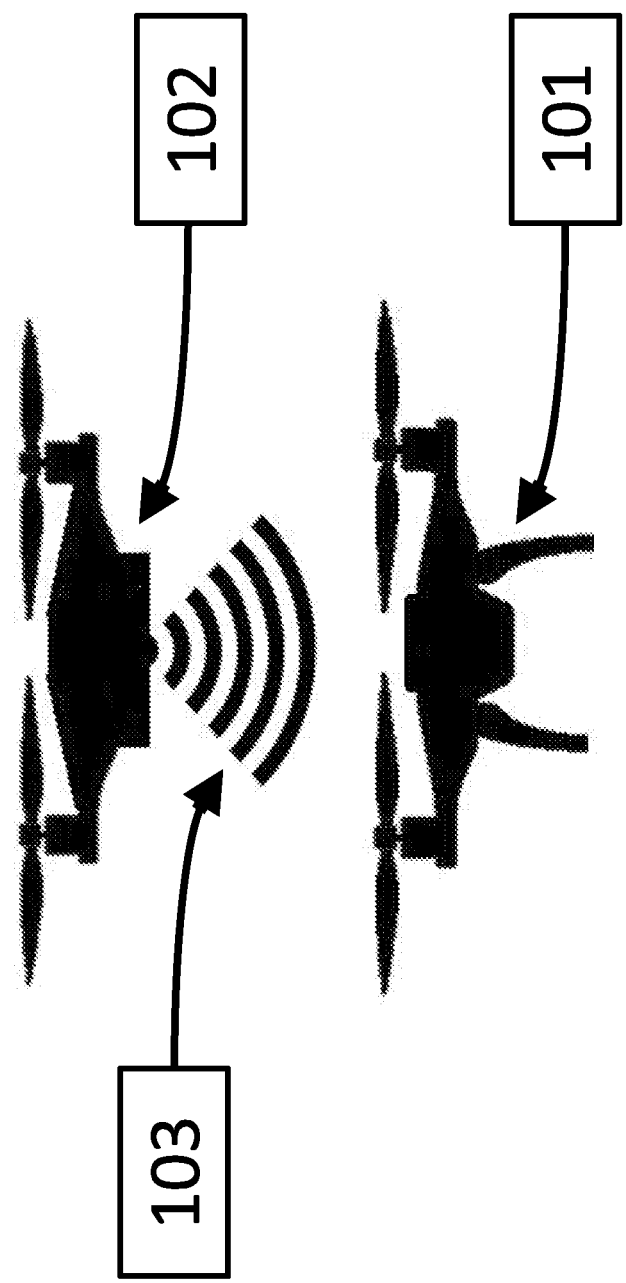
FIG. 1 depicts the generic escorting of a drone. Escorting drone 102 flies over escorted drone 101, and transmits to it escort signal 103.

Embodiments of disclosure operate to alleviate problems to mass deployment of drones by providing an escorting drone, which can escort drones under local control. Referring to FIG. 1, drone 101 (the escorted drone) is escorted by drone 102 (the escorting drone). This escorting is affected by means of an escort signal 103 transmitted from escorting drone 102 to escorted drone 101.

For the purposes of discussion of a use case, we will assume a fleet of autonomous drones configured to transport packages to and from customers. Each drone is assumed equipped with a GNSS receiver and inertial navigation system capable of determining location of the drone to within a desired tolerance (typically 5 meters). Drone GNSS receivers may be configured to receive multiple GNSS signal types, such as US GPS signals L1 and L2C, and/or Russian GLONASS signals, in order to attain a tighter location fix, equal to about 1 meter). The drones may further be equipped with one or more cameras for purposes of collision avoidance and identification of marked landing zones. Drones may further be equipped with altimeters, to aid in determining drone altitude. Drones are capable of carrying packages up to some maximum weight (say several kilograms) and have limited round-trip flight times (say thirty minutes).

We further posit a network of droneports similar to local airports, from which drones are sent to their destinations and to which they return after package pick-up or delivery. Unlike airports, droneports may be conveniently situated on rooftops of buildings in the city. Droneports are distributed around the city served by the delivery service, in such manner that the maximum distance between a droneport and a desired package destination is less than half the drone round-trip flight time. Thus if the drone round-trip flight time is 30 minutes, we will need droneports within 10 minutes of one-way flight time (taking into consideration landing and turn-around time) of each destination, or assuming a safe flight velocity of 30 km/h, droneports need to cover a radius of 5 km, i.e., to be placed every 10 km.

A network of droneports may comprise one or more dronehubs, each of which comprises a warehouse, and mechanisms for directly receiving and delivering packages to customers not covered by, or not desiring to use, the air delivery system. Dronehubs in different cities may be connected by conventional ground-based delivery.

Droneports comprise one or more docking zones at which a drone may swap or recharge its battery, load or unload its package, and may be programmed with flight plan and destination coordinates. Docking zones may be laid out in a rectangular grid, and may be visibly marked to assist in the landing process. At a given time only one drone may occupy a single docking zone, thus a droneport must be configured with docking zones commensurate with the maximum number of drones it may be called upon to host.

The simple scenario of short-range express delivery may function as follows. A customer places a delivery order with the drone network operator, for example by using the Internet via a mobile or web-based application. The delivery order contains the pickup address, destination address, and the package size and weight. The addresses may be street addresses and precise landing locations (e.g., roof, street level, window, etc.). Once the order process is complete, the drone flight plans are scheduled. When a fully charged drone departs from a docking zone at the closest droneport and flies to the pickup address. The customer loads the drone with the package, and the drone returns to the local droneport, landing in an unoccupied docking zone. The drone either swaps or charges its battery, and proceeds to the destination address. Once the package has been delivered the drone returns to the local droneport, once again landing in an unoccupied docking zone.

For a long-range delivery, the drone may visit one or more transit droneports to swap or recharge its battery. Visits at transit droneports may be pre-planned, and included in the flight plan with which the drone is initially programmed. For non-express delivery, the drone must visit a dronehub where the package may be stored in the warehouse for future delivery.

Figure 2:
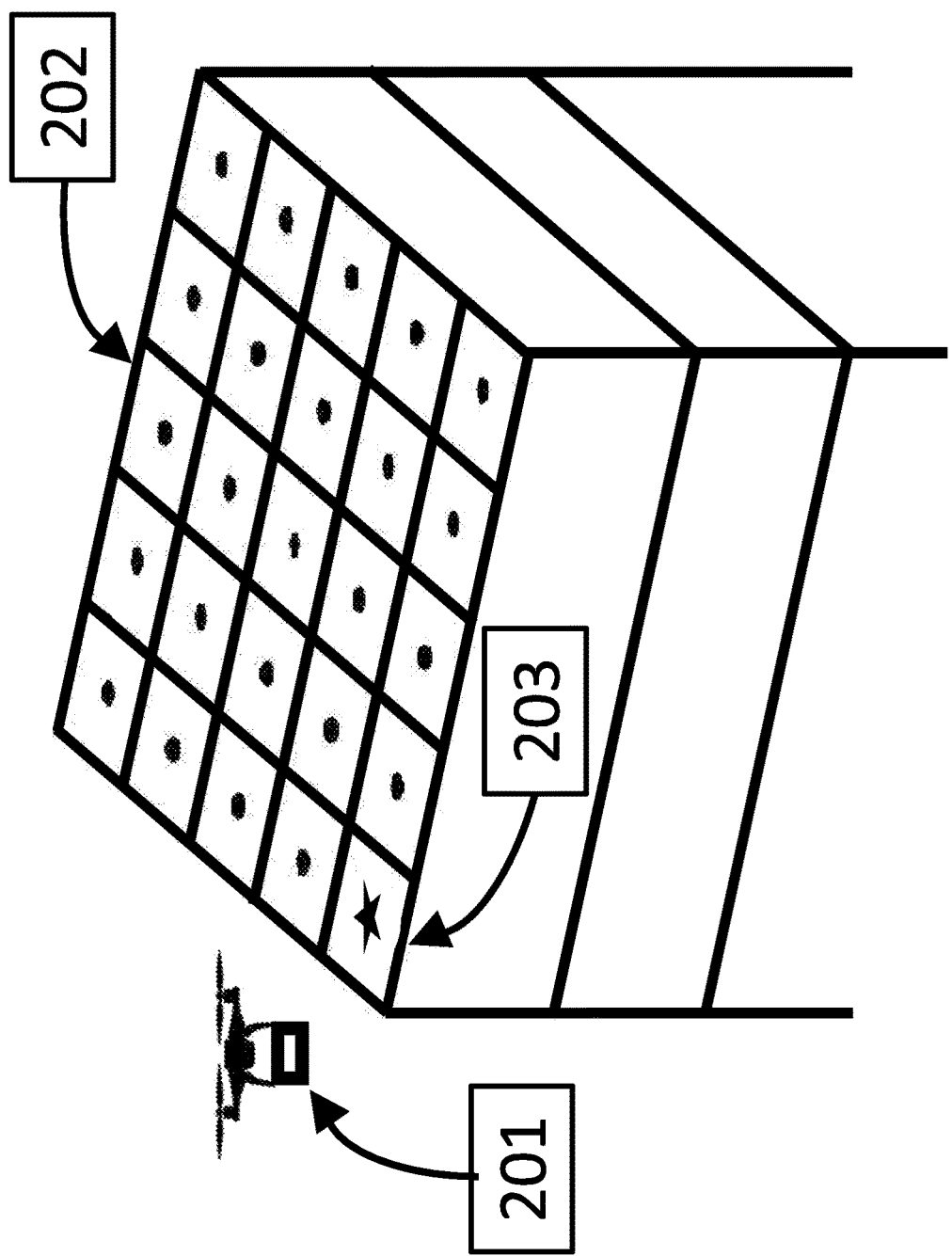
FIG. 2 depicts escorting a drone to a docking zone in a droneport on the rooftop of a building. Drone 201 approaches droneport 202 and initially hovers over hover point 203.
Figure 3:
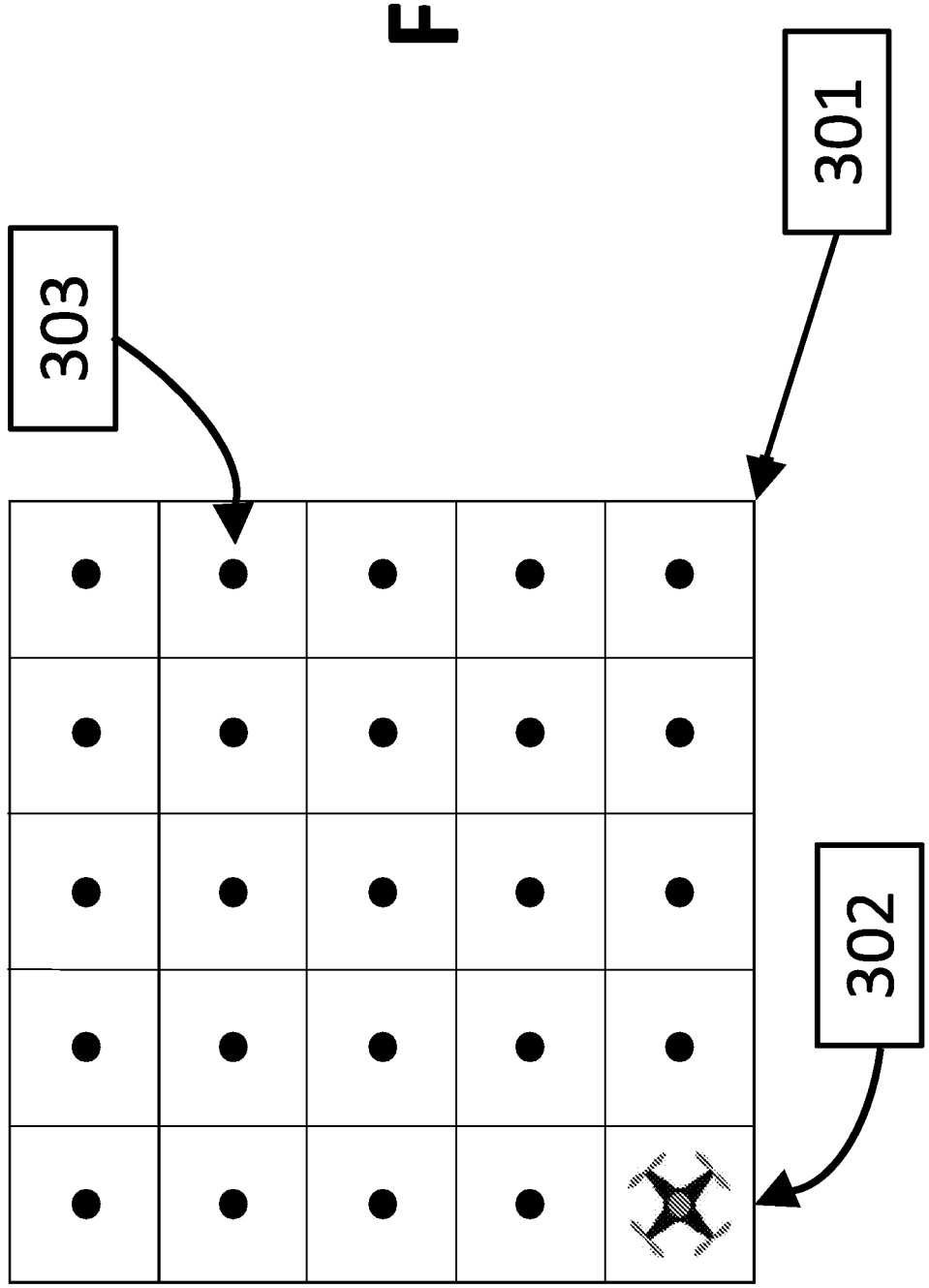
FIG. 3 depicts a droneport from above. The droneport 301 comprises hover point 302, occupied by a drone that needs to be escorted to desired docking zone 303.

FIG. 2 depicts drone 201 approaching rooftop droneport 202. Drone 201 has been preprogrammed to land at the particular droneport, but the specific required docking zone could not be known at the time when the drone was initially programmed. Instead, drone 201 has been programmed to hover at "hover point" 203. FIG. 3 depicts the same droneport (now marked 301) and hover point (now marked 302) from above.

The arrival of drone 201 at hover point 203 is detected by the escort system by means beyond the scope of the present disclosure. These means may be manual or automatic responsive to video cameras, RADAR, LIDAR, etc. In order to ensure that the drone reaches the docking zone to which it has been allocated 303, an escorting drone is launched to escort the approaching drone to the proper docking zone. The escorting drone approaches the escorted drone and guides it to docking zone 303 by transmitting an escort signal to the escorted drone.

The escorting drone may be manually operated by a trained escort drone operator, since the escort operation is local to the droneport, takes only a few minutes per drone, and clean line-of-sight can be maintained between operator and escorted drone. The escorting drone operator uses a drone flight controller that has been enhanced by having a switch that enables and disables transmission of the escort signal. Alternatively, the operation, including tracking the escorted drone in order to remain in its proximity, may be automated, e.g., based on monitoring by video cameras, LIDAR, etc. Automatic tracking of the escorted drone may be accomplished autonomously by the escorting drone or assisted by ground-based means, and is beyond the scope of the present disclosure.

Figure 4:
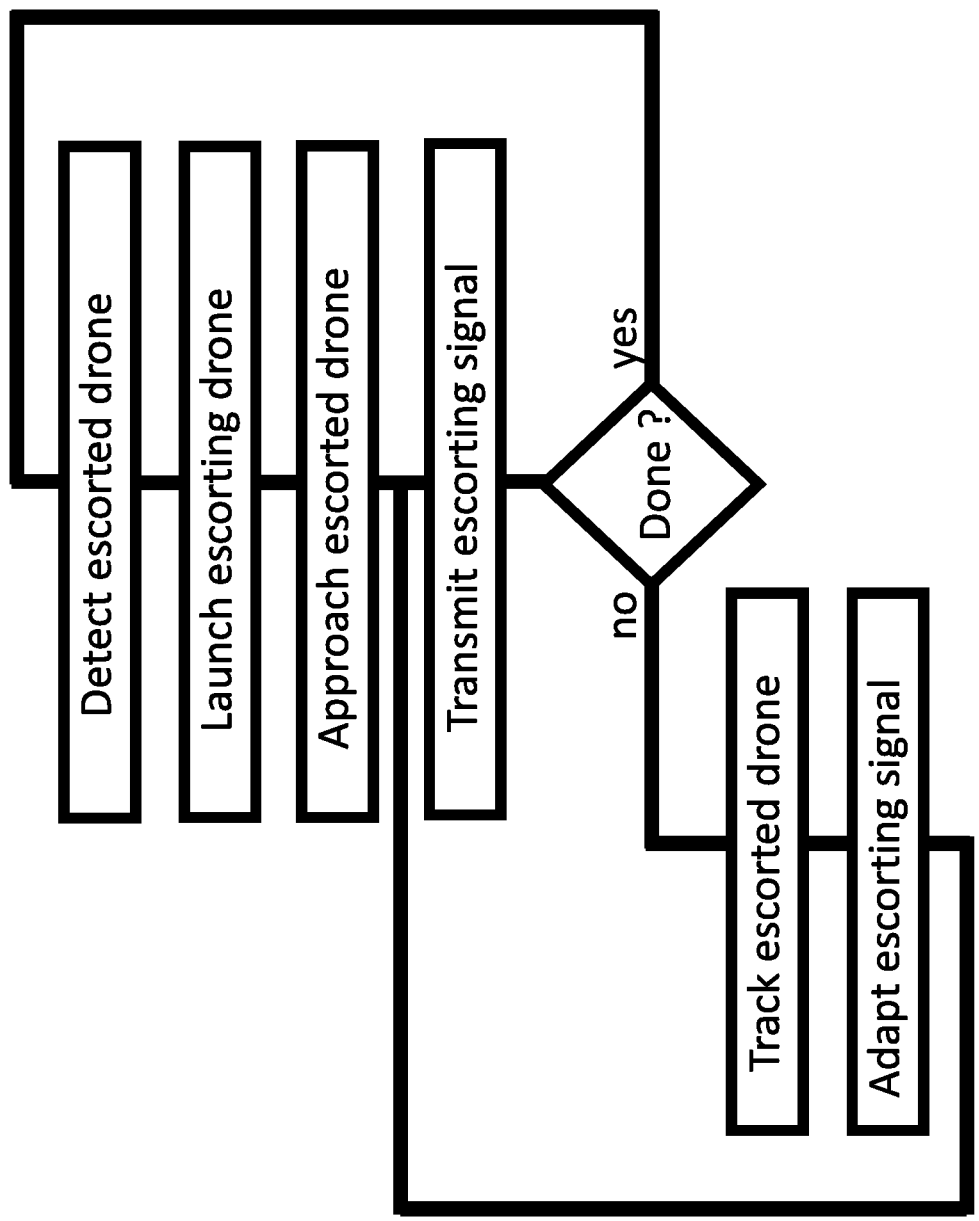
FIG. 4 contains a flow chart detailing drone escorting operation.

Overall operation of a generic escorting process is described in FIG. 4. The escorting process commences with detection of the drone to be escorted and launching of the escorting drone. The escorting drone approaches the escorted drone and commences transmission of the escort signal. The escorted drone is continuously tracked and the escort signal may need to be modified accordingly, until the escorted drone reaches its final destination. The escorting drone is then free to escort another drone as needed.

In an embodiment, escorted drone 201 is a standard autonomous drone, and is unaware that an escort mechanism is being employed. The escorted drone has been preprogrammed to approach and hover over a particular hover point 302 at the entrance to the droneport. The escorting drone is launched and intercepts it at that point, hovers in its proximity, and then transmits an escort signal. In an embodiment this escort signal is a GNSS signal transmitted at very low power in order to avoid interference with other GNSS receivers in the vicinity. The escorted drone's GNSS receiver receives this signal due to the proximity of the escorting and escorted drones, the high processing gain of the escorted drone's GNSS receiver. By configuring the escorting drone with a directional antenna, interference with other GNSS receivers may be even further reduced. Finally, even were a foreign GNSS receiver at some location to receive the escort signal, due to the flight of the escorting drone the exposure will be limited in duration ruling out adverse effects.

The escort signal is similar to the GNSS signal that would be received at the position of the escorted drone, but modified so that the escorted drone's GNSS receiver interprets the required docking zone as the hover point. The escorted drone in its attempt to remain at the preprogrammed hover point actually flies to the required docking zone. During this flight, the escorting drone tracks the movement of the escorted drone to ensure that the escorted drone is reacting to the escort signal. Note that in this application the escort signal need not be adapted during flight, maintaining the constant offset from landing zone to hover point. Once the escorted drone arrives above the required landing zone, the escorting drone changes the escort signal and now transmits a GNSS signal that the escorted drone's receiver interprets as indicating that the escorted drone's altitude is too high, causing the escorted drone to descend into the docking zone.

A GNSS receiver operates by receiving signals from a number of satellites travelling in known orbits. By measuring the delay to each satellite, the distances to those satellite's known locations can be determined, and the intersection of all these distances leads to equations that can be solved for the receiver's location. Satellites belonging to the US GPS system transmit on the same frequency and be distinguishable by each satellite applying a unique coding. Other GNSS systems may utilize distinguish satellites by different transmission frequencies (Frequency Division Multiple Access—FDMA), or in some other manner.

As a concrete example, satellites of the US GPS system transmit about 25 watts from an altitude over 20,000 km above earth. Taking into account the satellite antenna's gain and the free-space loss, GPS signals are received at about −130 dBm (decibels below a milliwatt), or about 0.1 femtoWatt. Hence, transmitting at extremely low power levels will suffice to overcome the true signals and cause a drone's GPS receiver to lock onto the escort signal, while not interfering with other GPS receivers in the neighborhood.

The GNSS escort signal may be identical to the aggregate GNSS signal that would be received at the escorted drone's location from all GNSS satellites, except for being slightly stronger in power and having slightly different delays for individual satellite components. These modified delays result in the GNSS receiver solving a slightly different set of equations, resulting in an offset in its perceived location.

A GNSS escort signal may be synthesized based on known satellite parameters, or generated based on received GNSS signals. In the first case, the orbital parameters of all the satellites belonging to a GNSS system are obtained. One then calculates which satellites are visible at a desired position, and with what delays their signals would be received at that position. A synthesized aggregate GNSS signal is created by summing delayed versions of the signals of each visible satellite. A further gain may be applied in order to ensure that the GNSS escort signal overpowers any received GNSS signals.

Alternatively, a GNSS escort signal may be created by modifying received GNSS signals. The escorting drone receives the true aggregate GNSS signal and separates it into components belonging to individual satellites. It then uses known orbital parameters to compute the delays of these component signals at the desired position. It then creates time-shifted versions of these components (taking into account that the relative delays may require non-causal processing) and sums these to create the aggregate GNSS escort signal. A further gain may be applied in order to ensure that the GNSS escort signal overpowers any received GNSS signals.

As a result of receiving a GNSS escort signal, the escorted drone perceives its position to be the coordinates indicated by the escort signal. If the escorted drone's GNSS receiver is configured to receive GNSS signals of more than one type, the escort signal may comprise GNSS signals of all signal types for which the GNSS receiver is configured. Alternatively, the escort signal may comprise an aggregate GNSS signals of one type, and signals designed to disable use by the escorted drone's receiver of the other types of GNSS signals.

The escorted drone perceives its location to be offset with respect to the hover point, and in order to return to what its GNSS receives perceives to be the hover point, it in fact flies to the docking zone.

As a concrete example, if the desired docking zone is 20 meters to the north of the hover point, the escort signal is fashioned so that the escorted drone's GNSS receiver indicates that it is actually 20 meters to the south of the hover point. The escorted drone then moves 20 meters to the north in order to correct for the perceived offset. The escort signal may now be modified so that the escorted drone's GNSS receiver indicates that it is actually higher than desired (this corresponds to delaying all components by the same amount), causing the escorted drone to compensate by descending into the docking station.

In another use case, an operator of a manually operated drone has lost control of it, leaving it stranded hovering at the location corresponding to the GNSS coordinates of its last received command. If this location is above a building, a busy highway, or a body of water, it may not be manually retrieved. A rescue-service escorting drone is sent to escort the lost drone to safety. Once again, the escort signal may be identical to the aggregate GNSS signal that would be received at the escorted drone's location, except for being slightly stronger in power and having slightly different delays between components with different codings. These modified delays result in the GNSS receiver solving a slightly different set of equations. The drone moves in an attempt to remain at what its GNSS receives perceives to be the coordinates of the last received command, in fact flying to a location where it can be retrieved.

In another embodiment, the rescue-service escorting drone transmits an escort signal on the radio frequency control channel. The escort signal may be a stronger relayed version of the signal transmitted by the controller. If the parameters of the radio frequency control channel are known to the escorting drone (e.g., frequency channel, control protocol, and encryption keys if the control channel is encrypted), then the escort signal may be control signals configured to guide the escorted drone to safety.

Figure 5:
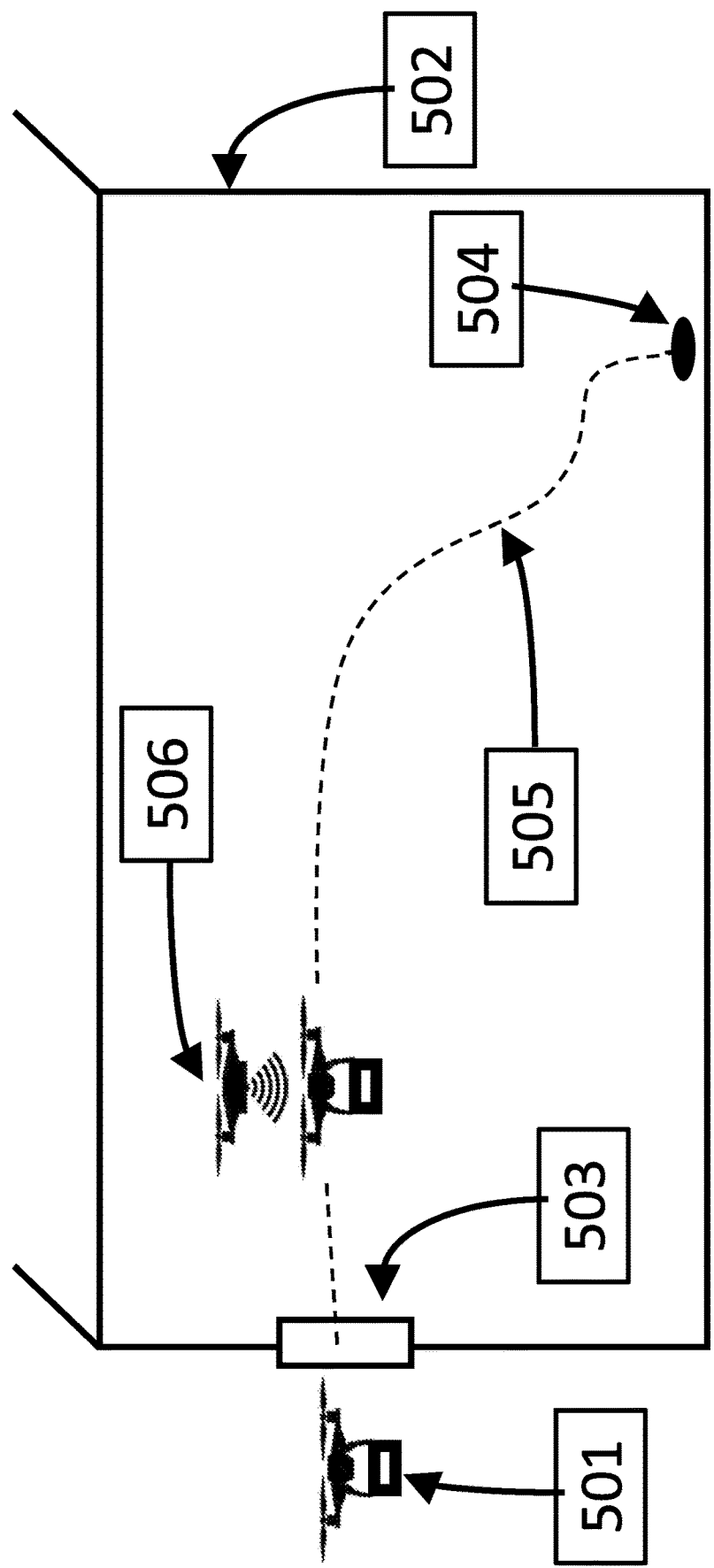
FIG. 5 depicts escorting a drone through a building. Drone 501 approaches building 502 and enters via window 503. It is reaches destination 504 via path 505 by being escorted by escort drone 506.

In another use case, an autonomous package delivery drone is required to navigate inside a building where GNSS signals can't be received. Referring to FIG. 5, drone 501 needs to reach a destination inside building 502. Drone 501 is preprogrammed to approach window 503, but cannot navigate to destination point 504 due to lack of GNSS satellite reception in building 502. In order to enable drone 501 to do so, escorting drone 506 is launched, approaches escorted drone 501, guides it along path 505 to destination 504 by transmitting an escort signal to the escorted drone.

In an embodiment, escorted drone 501 is a standard autonomous drone, and is unaware that an escort mechanism is being employed. Escorted drone 501 has been preprogrammed to approach window 503 and hover there. Escorting drone 506 intercepts it at that point, hovers near it (for example, above it in close proximity), and then transmits a low-power GNSS escort signal. In this embodiment, the escort signal is synthesized to simulate the actual GNSS signal that would be received at the escorted drone's true location were it not for the building blocking the signals. The escorting drone tracks the escorted drone, remaining near it (for example, above it in close proximity), and continuously adapts the transmitted escort signal to reflect the true location along to the desired path. Once the escorted drone arrives at desired destination 504 inside the building, its package can be unloaded and/or loaded, and the drone can escorted back out the building.

In a similar use case, the drone needs to travel between buildings, where GNSS satellite reception is impaired. Once again, an escorting drone is sent to guide it along a safe path between the buildings, until it arrives at its destination or is once again in an area of good GNSS reception. The escort signal is synthesized to simulate the actual GNSS signal that would be received at the escorted drone's true location were it not for the buildings impairing reception.

Figure 6:
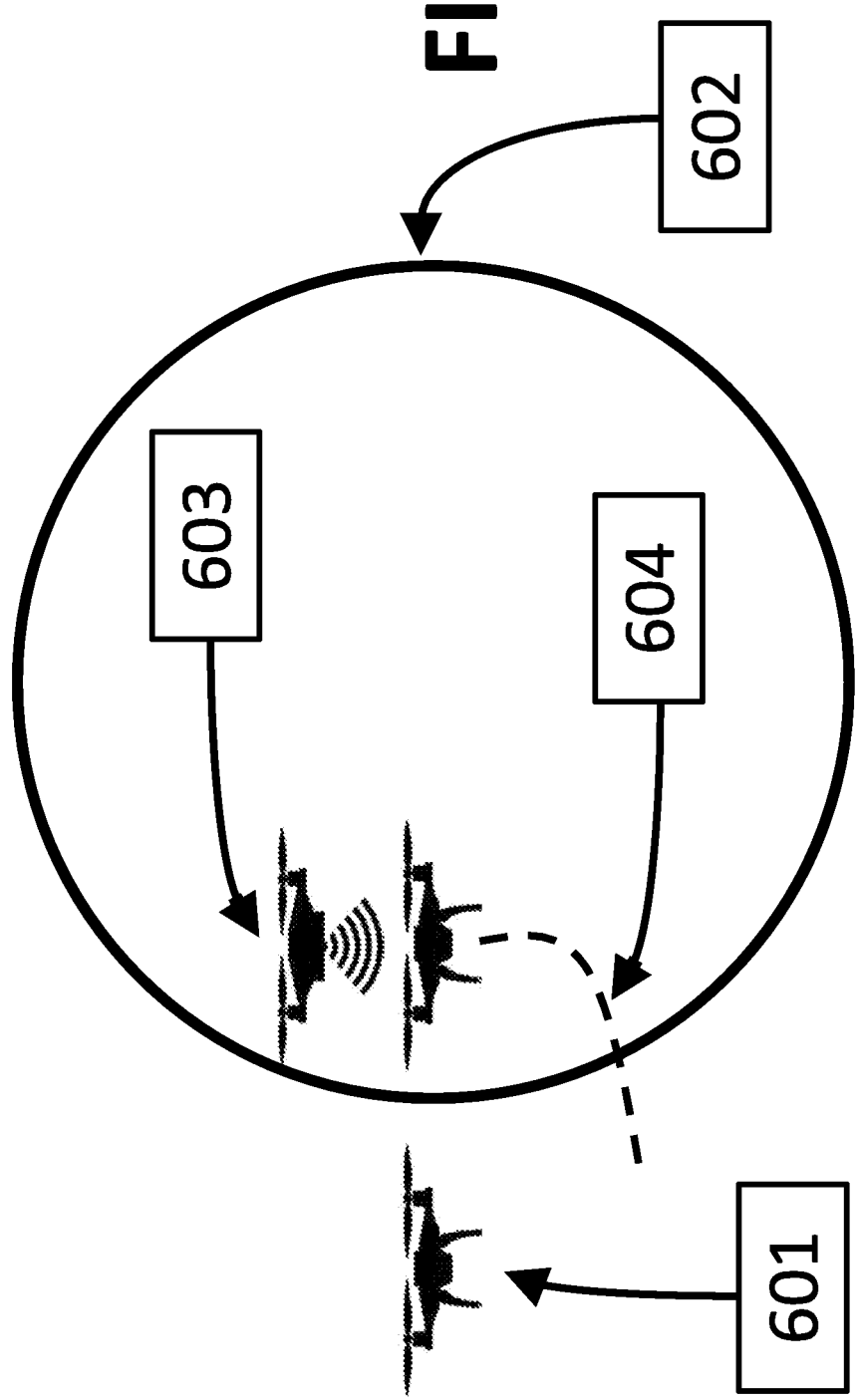
FIG. 6 depicts escorting a drone out of a no-flight zone. Drone 601, which strays into no-flight zone 602, is escorted by escorting drone 603, via path 604, out of the no-flight area.

In another use case, a drone (either autonomous or controlled) strays into a no-flight zone, e.g., near an airport, a hospital, or the location of an event attended by large numbers of people. Referring to FIG. 6, drone 601 strays into no-flight zone 602. In order to ensure that drone 601 expeditiously leaves the no-flight zone, escorting drone 603 is launched, and escorts drone 601 out of the no-flight zone by the shortest safe path 604. Alternatively, escorting drone 603 may guide escorted drone 601 to a designated landing zone. Escorting drone 603 guides escorted drone 601 by transmitting to it an escort signal.

In an embodiment, the escort signal is transmitted on the radio frequency control channel. If the parameters of the radio frequency control channel are known to the escorting drone (e.g., frequency channel, control protocol, and encryption keys if the control channel is encrypted), then the escort signal may be transmitted at a power stronger than that of the control signals from the original controller, thus taking over control of the drone. If these parameters are unknown, the escort signal may be configured to interfere with reception of the original control channel, triggering an automatic "return-to-home" feature in the escorted drone.

In another embodiment, escorted drone 601 is a standard autonomous drone, and is unaware that an escort mechanism is being employed. Escorting drone 603 approaches it as it enters the no-flight zone, and remains in its proximity, transmitting a low-power GNSS signal. The escorted drone's GNSS receiver interprets this signal, causing the escorted drone to exit the no-flight zone.

In this case, the flight plan of the escorted drone may be unknown and hence the escort signal needs to be continuously adapted, as in FIG. 4. As a concrete example, if the escorted drone enters the no-flight zone from the east, the escort signal needs to be fashioned so that the drone perceives its location to be further west than intended, so that it compensates by flying eastwards. However, as the escorted drone moves the escorting drone needs to track it and remain in its proximity, continuously adapting the escort signal in order to ensure that it exits the no-flight zone.

Drones may be configured with a video camera or cameras, and live video may be sent back to the drone operator over the radio frequency control channel. It is also possible for the drone to utilize video information for navigation by comparing the live video stream with information stored in the drone's memory. In such cases, an escort signal, whether a GNSS escort signal or radio frequency control channel escort signal, imparts contradictory information and may be unable to reliably control the stray drone. In such cases a "blinding drone" may be employed. Both the escort drone and the blinding drone approach the stray drone as it enters the no-flight zone; the escort drone positioned above the stray drone and the blinding drone below it. The escort drone transmits an escort signal and the blinding drone flashes a bright light at the stray drone's video camera, preventing the use of the video information.

In the preceding description we have focused on the escorting of an escorted drone by means of an escorting drone. One versed in the art would appreciate that the escort signal could be transmitted from other escorting apparatuses, for example from an escorting apparatus positioned by means of an overhead movable arm or boom, or from a collection of escorting antennas distributed throughout the length of a corridor. As in the case of the escorting drone, the escort signal will be transmitted is such fashion as to limit interference to other nearby receivers.

Descriptions of use cases in the present application are provided by way of example and are not intended to limit the scope of the invention. The described embodiments comprise different features, not all of which are required in all embodiments. Some embodiments utilize only some of the features or possible combinations of the features. Variations of embodiments of the invention that are described, and embodiments comprising different combinations of features noted in the described embodiments, will occur to persons of the art. The scope of the invention is limited only by the claims.

We claim:

1. A method for escorting a first drone along a desired flight path, the method comprising:
   identifying a first location of a first drone having an onboard signal receiver for receiving location signals and processing the received signals to determine locations of the first drone and a controller configured to control flight of the first drone responsive to the determined locations;
   flying a second drone to a location proximate to the first drone, the second drone comprising an onboard transmitter operable to transmit an escort signal to the first drone from the proximate location that overrides location signals received by the onboard signal receiver of the first drone;
   wherein the escort signal operates to control the first drone to accompany the second drone along a desired flight path.

2. A method according to claim 1 wherein the escort signal is a GNSS signal.

3. A method according to claim 1 wherein the escort signal is a radio frequency control channel signal.

4. A method according to claim 3 wherein the escort radio frequency control channel signal triggers an automatic mechanism causing the escorted drone to fly to a predetermined location.

5. A method according to claim 2 wherein the escort GNSS signal is an aggregate GNSS signal that would have been received by the escorted drone, except for signal power and delays of the GNSS component signals.

6. A method according to claim 5 wherein the escort GNSS signal is generated by:
   predicting the positions of GNSS satellites based on known orbital parameters;
   computing which satellites would be observed at the desired location;
   synthesizing a component GNSS signal for each observable satellite;
   applying a signal delay that would be experienced by each component GNSS signal at the desired location;
   combining the time shifted component GNSS signals into an aggregate GNSS escort signal; and
   optionally applying a gain to the aggregate GNSS escort signal.

7. A method according to claim 5 wherein the escort GNSS signal is generated by:
   receiving an aggregate GNSS signal;
   separating the aggregate GNSS signal into component GNSS signals;
   time shifting each component GNSS signal;
   recombining the time shifted component GNSS signals into an aggregate GNSS escort signal; and
   optionally applying a gain to the aggregate GNSS escort signal.

8. A method according to claim 1 wherein the escort signal is adapted over time in accordance with the path of the first drone and the desired flight path.

9. A method according to claim 2 wherein the GNSS escort signal comprises an aggregate GNSS signal of one GNSS type, and components designed to disable use of other GNSS types.

10. A method according to claim 1 wherein the first drone is escorted through a location where GNSS signals are not received.

11. A method of generating an aggregate GNSS escort signal configured to be received by a drone and responsive to which the drone determines a desired drone location different from the drone's actual location, the method comprising:
    predicting the positions of GNSS satellites based on known orbital parameters;
    computing which satellites would be observed at the desired location;
    synthesizing a component GNSS signal for each observable satellite;
    applying a signal delay that would be experienced by each component GNSS signal at the desired location;
    combining the time shifted component GNSS signals into an aggregate GNSS escort signal; and
    optionally applying a gain to the aggregate GNSS escort signal.

12. A method according to claim 11 wherein the aggregate GNSS escort signal is configured to avoid interference with GNSS receivers in the neighborhood.

13. A method according to claim 11 comprising using the GNSS escort signal to configure a desired flight path for the drone and adapting the escort signal over time in accordance with location of the escorted drone along the desired flight path.

14. A method of generating an aggregate GNSS escort signal configured to be received by a drone and responsive to which the drone determines a desired drone location different from the drone's actual location, the method comprising:
    receiving an aggregate GNSS signal;
    separating the aggregate GNSS signal into component GNSS signals;
    time shifting each component GNSS signal to generate a signal delay for the component that the component would experience if received at the desired location;
    recombining the time shifted component GNSS signals into an aggregate escort GNSS signal; and
    optionally applying a gain to the aggregate GNSS escort signal.

15. A method according to claim 14 and comprising using the GNSS escort signal configure a desired flight path for the drone and adapting the escort signal over time in accordance with location of the escorted drone along the desired flight path.

* * * * *